No. 719,372. PATENTED JAN. 27, 1903.
W. RENGER.
VEHICLE FOR TRANSPORTATION OF ANIMAL BODIES.
APPLICATION FILED AUG. 4, 1902.
NO MODEL. 3 SHEETS—SHEET 1.
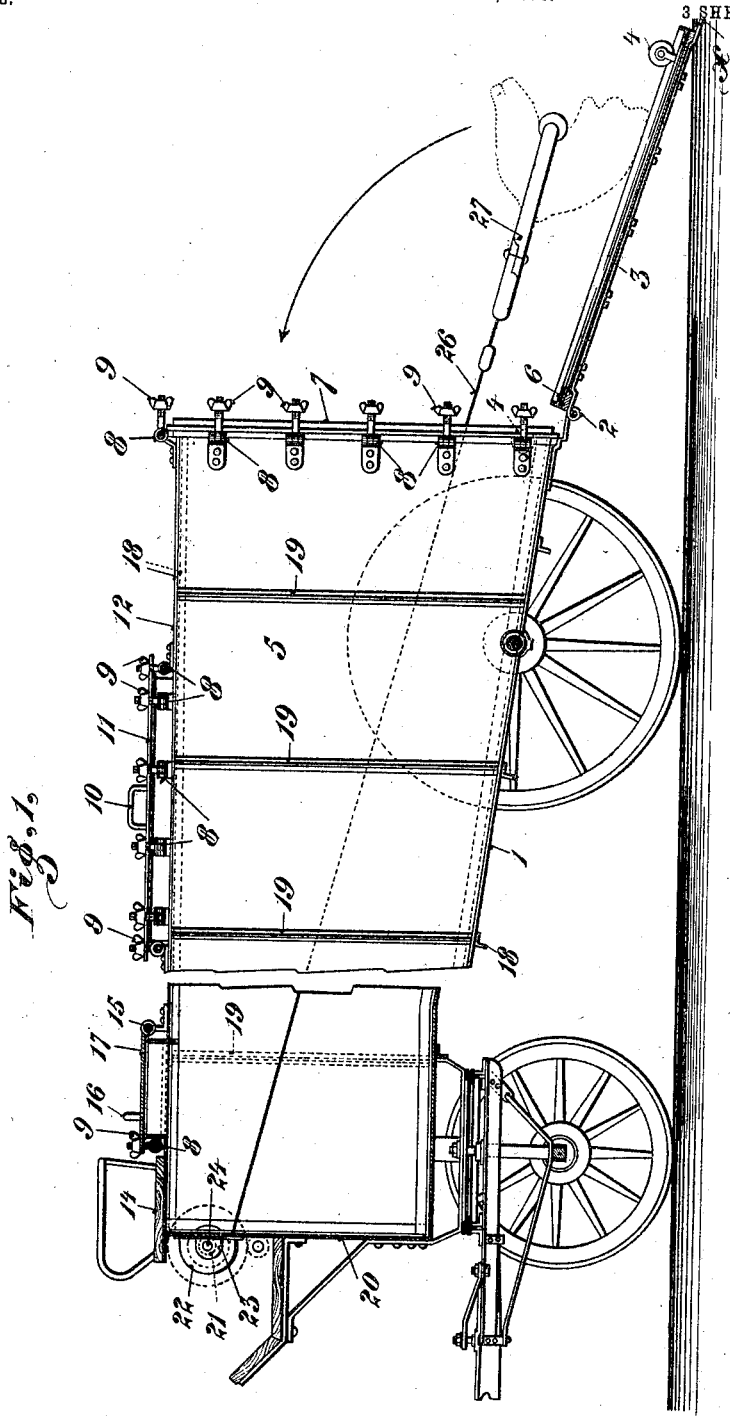
Witnesses:
Inventor
Wilhelm Renger
By James L. Norris
Atty No. 719,372. PATENTED JAN. 27, 1903.
W. RENGER.
VEHICLE FOR TRANSPORTATION OF ANIMAL BODIES.
APPLICATION FILED AUG. 4, 1902.
NO MODEL. 3 SHEETS—SHEET 2.
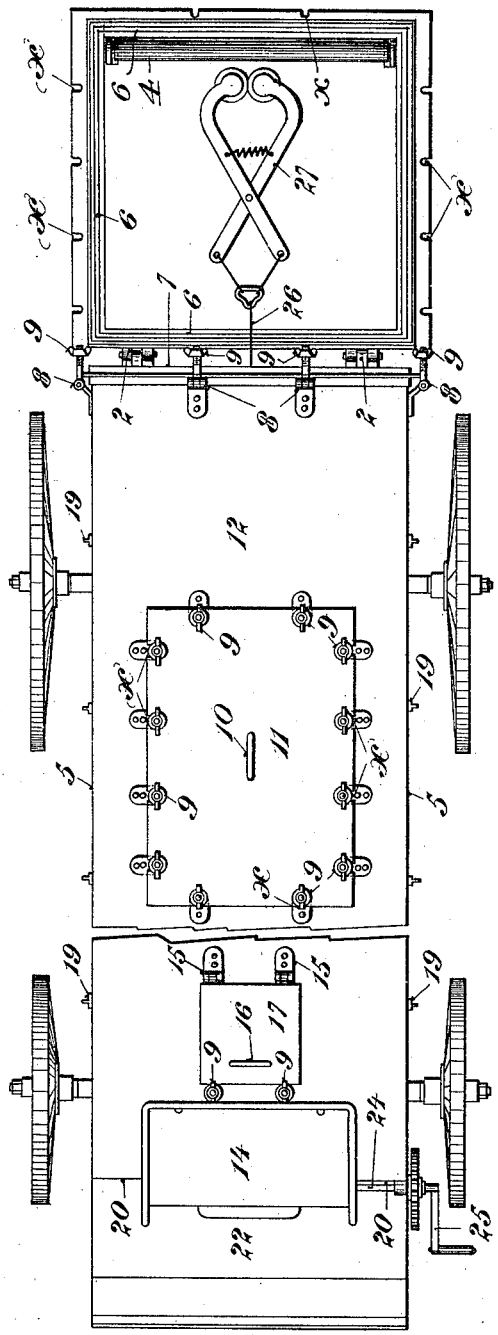
Witnesses:
Inventor
Wilhelm Renger
By
James L. Norris
Atty.

No. 719,372. PATENTED JAN. 27, 1903.
W. RENGER.
VEHICLE FOR TRANSPORTATION OF ANIMAL BODIES.
APPLICATION FILED AUG. 4, 1902.
NO MODEL. 3 SHEETS—SHEET 3.
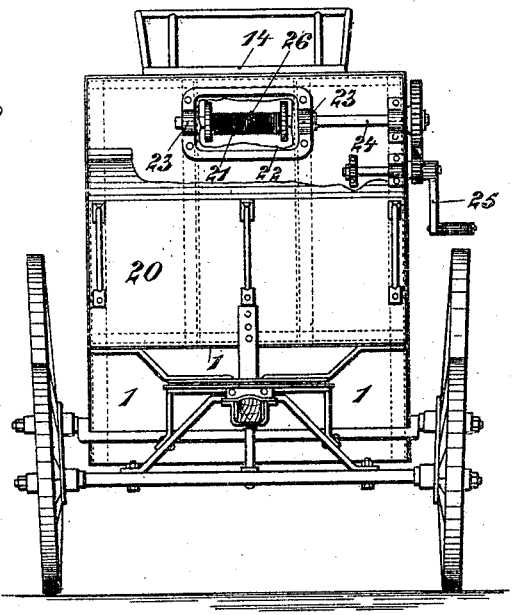

UNITED STATES PATENT OFFICE.

WILHELM RENGER, OF ARNSTADT, GERMANY.

VEHICLE FOR TRANSPORTATION OF ANIMAL-BODIES.

SPECIFICATION forming part of Letters Patent No. 719,372, dated January 27, 1903.

Application filed August 4, 1902. Serial No. 118,353. (No model.)

*To all whom it may concern:*

Be it known that I, WILHELM RENGER, manufacturer, a subject of the Prince of Schwarzburg - Sondershausen, residing at Arnstadt, in the Dominion of the Prince of Schwarzburg - Sondershausen and German Empire, have invented certain new and useful Improvements in or Relating to Vehicles or Receptacles for the Transport of Animal Bodies, Carcasses, Refuse, and the Like, of which the following is a specification.

My present invention relates to a vehicle for the transport of animal bodies, carcasses, meat-refuse, and the like. The vehicle has the advantage that the casing or vehicle itself, as well as the refuse-receptacles, can be completely and hermetically closed. The rear wall or back of the vehicle is formed by a door hinged at the bottom and provided with guide-rollers, thus serving as an inclined hoisting-surface when let down. On the front wall immediately beneath the seat of the driver is arranged a winch or hoist, while on the top two hermetically-closable covers capable of being opened are arranged, of which the smaller one, situated immediately behind the driver's seat, allows of the introduction of small bodies, while the larger cover or door serves for the introduction of large bodies in case the front part of the vehicle is already filled. The refuse or like receptacles can be introduced through the back opening.

In the accompanying drawings a practical construction of a vehicle according to this invention is shown.

Figure 1 is a side elevation, partly in section, of the vehicle. Fig. 2 is a top plan view. Fig. 3 is a front view.

The vehicle rests, according to its length, on one or more axles provided with wheels. The body or casing 5 of the vehicle is provided with a horizontal or downwardly and rearwardly inclined bottom 1, as shown, and with a rear closure wall or door 3. The latter is hinged to the body or casing 5 by means of the connections 2, which also form a support for the wall or door 3 when it is in closing position. The wall or door 3 when lowered serves as an inclined hoisting plane, for which purpose it is fitted with two transverse rollers 4, which upon closing the rear wall lie within the casing 5. This door can be closed hermetically by being provided along its edge with a frame-like packing or flange 6, which fits into the casing-rim 7 of L or T iron. The door is securely clamped by means of a number of screw-bolts 9, attached to the walls of the casing at 8 and engaging in slots in the door 3. In the same manner the cover 11 in the top cover 12 of the vehicle and provided with a handle 10 can be closed hermetically and also the cover 17, provided with a handle 16 and situated immediately behind the seat 14 of the driver and capable of being opened backwardly on its hinges. The whole of the casing 5 is preferably made of sheet-iron, on which a top and bottom are reinforced or connected by angle-irons 18 and laterally strengthened and connected by T-irons 19. The front wall also is reinforced by angle-irons and connected to the side walls of the casing 5. The winch 21 is arranged close below the seat 14 of the driver on the front wall 20 and is inclosed at the front by a casing 22. The casing 22 carries the bearings 23 for the shaft 24 of the winding-drum, which is operated by suitable gearing by means of a crank-handle 25. The chain or rope 26 of the drum carries at its free end a grab-hook 27 or the like, so arranged that the body or object to be drawn into the vehicle 5 is easily and safely attached to the chain. Owing to the bottom of the casing 5 being rearwardly and downwardly inclined and in line with the rear wall 3, when the latter is folded down, thus serving as an inclined hoisting plane, and in consequence of the arrangement of the rollers 4 on the rear wall 3, it is easy to remove even very heavy bodies in a short time, while owing to the hermetic closure of the casing 5 any danger due to noxious emanations is safely removed. The material used for the casing being preferably galvanized iron, the parts can be thoroughly cleansed and disinfected at any time.

Having now particularly described and ascertained the nature of my invention, what I claim is—

A vehicle for the transport of animal bodies, carcasses, refuse and the like, comprising a body provided with an opening in its top and at one end, a roller arranged upon the upper face of the bottom of the body at its open end, a door for closing the open end of the body and provided with notched edges, a hermetically-sealable means carried by the door, a roller connected to the inner face of the door, means for hinging the door to the body, said means supporting the door when in its closing position, means engaging in the notches of the door for fastening it to the body when in its closing position, means for hermetically sealing the opening in the top of the body, a casing connected to the forward end of the body, means mounted in the casing for drawing an animal-body or other object into the receptacle, and a grab connected to the said indrawing means.

In testimony whereof I have hereunto set my hand in presence of two subscribing witnesses.

WILHELM RENGER.

Witnesses:
PAUL TEICHMANN,
ERNST EBERHARDT.